(12) United States Patent
Kumar et al.

(10) Patent No.: US 8,323,376 B2
(45) Date of Patent: Dec. 4, 2012

(54) LEAD RECYCLING

(75) Inventors: Ramachandran Vasant Kumar, Cambridge (GB); Vega Petrova Kotzeva, Basel (CH); Seref Sonmez, Istanbul (TR)

(73) Assignee: Cambridge Enterprise Limited, Cambridge (GB)

( * ) Notice: Subject to any disclaimer, the term of this patent is extended or adjusted under 35 U.S.C. 154(b) by 784 days.

(21) Appl. No.: 12/513,707

(22) PCT Filed: Nov. 6, 2007

(86) PCT No.: PCT/GB2007/004222
§ 371 (c)(1),
(2), (4) Date: Jul. 13, 2009

(87) PCT Pub. No.: WO2008/056125
PCT Pub. Date: May 15, 2008

(65) Prior Publication Data
US 2010/0040938 A1 Feb. 18, 2010

(30) Foreign Application Priority Data
Nov. 8, 2006 (GB) .................................. 0622249.1

(51) Int. Cl.
*C01G 21/00* (2006.01)
*C01G 21/06* (2006.01)
*C22B 13/00* (2006.01)

(52) U.S. Cl. ............... 75/714; 75/743; 423/92; 423/98; 562/400

(58) Field of Classification Search ............ 75/710, 75/711, 714; 423/89, 92, 98
See application file for complete search history.

(56) References Cited

U.S. PATENT DOCUMENTS

| | | | |
|---|---|---|---|
| 4,769,116 A * | 9/1988 | Olper et al. | 205/599 |
| 5,292,456 A | 3/1994 | Francis et al. | |
| 5,342,449 A | 8/1994 | Holbein et al. | |
| 5,536,899 A | 7/1996 | Forrester | |
| 5,690,718 A * | 11/1997 | Sabin | 75/711 |
| 2002/0043308 A1* | 4/2002 | Giusti | 148/432 |

FOREIGN PATENT DOCUMENTS

| | | | |
|---|---|---|---|
| GB | 2284702 A * | 6/1995 | |
| SU | 1159958 | 6/1985 | |
| WO | 2005/007904 | 1/2005 | |
| WO | WO 2005007904 A1 * | 1/2005 | |

OTHER PUBLICATIONS

Ferracin et al., Lead recovery from a typical Brazilian sludge of exhausted lead-acid batteries using an electrohydrometallurgical process, 2002, Hydrometallurgy, 65, pp. 137-144.*
Ferracin, L.C. et al., "Lead recovery from a typical Brazilian sludge of exhausted lead-acid batteries using an electrohydrometallurgical process," Hydrometallurgy (2002) 65:137-144.
International Search Report and Written Opinion for Application No. PCT/GB2007/004222 dated Apr. 7, 2008 (10 pages).
Chinese Patent Office Action for Application No. 200780041628.4 dated Jun. 11, 2010 (5 pages).
European Patent Office Action for Application No. 07824458.9 dated Sep. 13, 2010 (4 pages).
European Patent Office Action for Application No. 07824458.9 dated Jun. 8, 2011 (4 pages).

* cited by examiner

*Primary Examiner* — Roy King
*Assistant Examiner* — Jared Wood
(74) *Attorney, Agent, or Firm* — Michael Best & Friedrich LLP

(57) ABSTRACT

The present invention describes a method of recycling lead from lead containing waste, the method comprising the steps of mixing the battery paste with aqueous citric acid solution so as to generate lead citrate; isolating lead citrate from the aqueous solution; and converting the lead citrate to lead and/or lead oxide.

17 Claims, 4 Drawing Sheets

Figure 1a-c
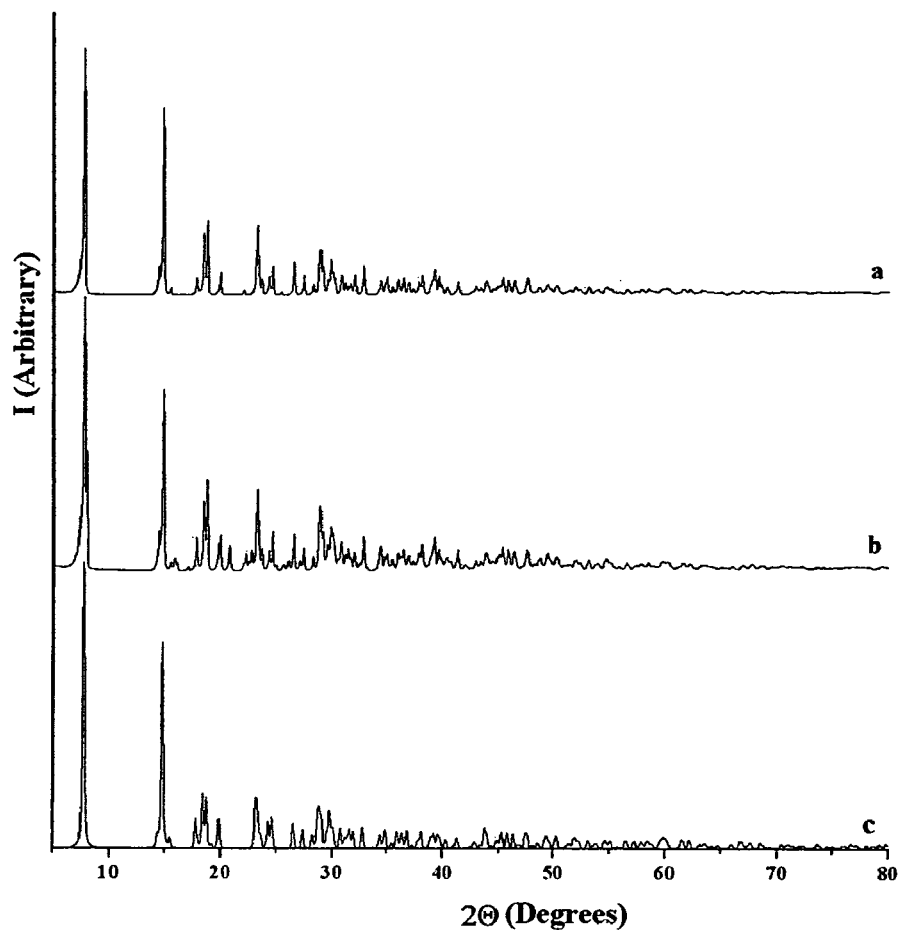
Figure 1d
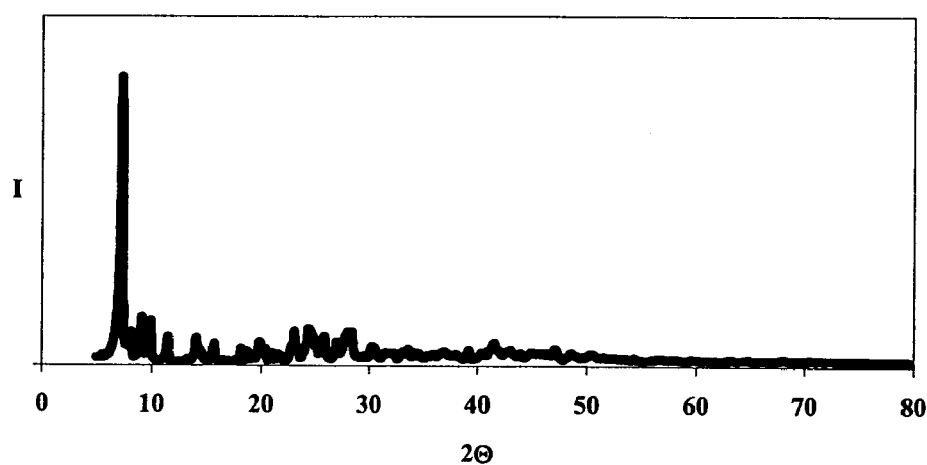

LEAD RECYCLING

CROSS-REFERENCE TO RELATED APPLICATIONS

This patent application is a national stage filing under 35 U.S.C. 371 of International Application No. PCT/GB2007/004222, filed on Nov. 6, 2007, which claims foreign priority benefits to United Kingdom Patent Application No. 0622249.1, filed on Nov. 8, 2006. These applications are incorporated herein by reference in their entireties.

FIELD OF THE INVENTION

The present invention is concerned with the recovery of lead from lead-containing waste. Particularly, but not exclusively, the present invention is concerned with a method of recovering lead from battery waste, and the final product of such a method.

BACKGROUND TO THE INVENTION

More than 50% of the world lead production is derived from recycled lead. It is believed that approaching 90% of lead in lead batteries is recycled. The recycling of lead batteries involves treatment of lead battery paste in order to separate the lead from the other battery components. This may involve physical separation techniques as well as chemical techniques such as hydrometallurgical processing, electrowinning and smelting (pyrometallurgical processing).

In the most common approach, the battery paste is charged into a traditional smelting blast furnace and decomposed at elevated temperatures to give metallic lead. The paste material contains a large amount of sulfur in the form of $PbSO_4$. Decomposition of this compound requires the use of relatively high temperatures, typically 1,100° C. or more. The pyrometallurgical processing of $PbSO_4$ is problematic for additional steps are required to prevent the release of $SO_2$ into the environment. High temperature processes also generate significant amounts of hazardous lead bearing fumes, dust and slag. Controlling harmful emissions is expensive, and frequently requires costly and specialist equipment. The processing of these harmful by-products is often laborious and time-consuming.

Hydrometallurgical methods have been used to fix sulphur in the battery paste in the form of soluble metal sulfates, which can be separated from the insoluble lead products generated in the treatment step. However, the collected lead products often retain a substantial amount of sulfur in the form of $PbSO_4$. If the collected product is taken to the smelter, steps must be taken to ensure that $SO_2$ emission is adequately dealt with.

Electrowinning processes can also be problematic as complex mixtures of chemicals are required to dissolve lead in a form suitable for treatment in an electrochemical cell. Such cells are energy intensive.

U.S. Pat. No. 4,118,219 describes a process for recycling junk lead-acid batteries. The process comprises the step of converting Pb and PbO to $PbSO_4$ using sulfuric acid. $PbO_2$ in the battery paste is reduced, either by calcination or through use of a chemical reducing agent, such as hydrogen peroxide, and then reacted with sulfuric acid to form $PbSO_4$. The $PbSO_4$ is dissolved out of the battery paste with a highly concentrated aqueous ammoniacal ammonium sulfate leaching solution. The aqueous solution is separated from the undissolved impurities, and the dissolved lead then converted to lead carbonate which is separated from the dissolved impurities and unreacted Pb and PbO. Lead carbonate is converted to PbO or Pb in a calcining furnace.

U.S. Pat. No. 4,269,810 describes a method of desulfating lead-acid battery mud by adding an aqueous solution of a treating agent, such as $Na_2CO_3$ or NaOH, to the crushed battery components. In this process, $PbSO_4$ reacts to generate metal sulfate, such as sodium sulfate, which is dissolved in the aqueous solution, and lead compounds, for example $PbCO_3$ and $Pb(OH)_2$, which precipitate out. The precipitated lead compounds are recovered along with solid PbO and $PbO_2$ by use of conventional separation techniques such as settling or centrifuging.

The present inventors have realised that current methods for the recovery of lead from battery waste require several processing steps to obtain lead in a form that is suitable for use in industry, for example for use in battery manufacture.

In many of the known lead recycling processes, the product of the recycling process contains lead in a number of different forms. The exact composition of the product can be difficult to control and difficult to predict, and can be influenced by the composition of the lead waste used. Further processing may be necessary to give a product that is suitable for use in industry.

There is a need for a process of recovering lead from lead battery paste that is simple and benign. Such a process should also be cost effective and comply with environmental legislation. There is also a need to avoid transporting lead battery waste to specialist facilities, and it would be advantageous to have a process that can be employed locally. Avoiding transport costs would increase the sustainability of any such process.

SUMMARY OF THE INVENTION

The present inventors have developed a simple method of recycling lead from lead waste.

Accordingly, in a general aspect, the present invention provides a method for recovering lead from lead waste.

In a first aspect, the present invention provides a method for the recovery of lead from lead waste, the method comprising the steps of:
 (a) treating the lead waste with aqueous citric acid solution so as to generate lead citrate;
 (b) isolating lead citrate from the aqueous solution; and
 (c) converting the isolated lead citrate to Pb and/or PbO.

Preferably, the lead waste is lead battery paste. Most preferably lead waste comprises $PbSO_4$, $PbO_2$, PbO and Pb.

Preferably, the pH of the aqueous citric acid solution is in the range pH 1.4 to pH 6.

Optionally, the aqueous citric acid solution additionally comprises one or more of the following: a metal citrate and hydrogen peroxide.

In a selected embodiment the aqueous citric acid solution additionally comprises hydrogen peroxide and the preferred mole ratio of PbO to hydrogen peroxide is in the range 1:0.1 to 1:4. Optionally, the mole ratio of PbO to citric acid is in the range 1:1 to 1:7.

Preferably, the temperature of the aqueous citric acid solution is maintained in the range 0 to 45° C.

Preferably, the solid to liquid ratio of the lead waste to aqueous solution is in the range 1:1 to 1:50.

Preferably, the isolated lead citrate is converted to Pb and/or PbO by calcination. Most preferably, the calcination temperature is in the range 250 to 1,100° C. In a further preferred embodiment, the partial pressure of oxygen in the calcination is in the range to 0.01 to 5 atm.

In a second aspect, the present invention provides a method of recycling a lead battery, the method comprising the steps of:
(a) obtaining lead battery paste from a lead battery;
(b) treating the lead battery paste with aqueous citric acid solution so as to generate lead citrate;
(c) isolating lead citrate from the aqueous solution;
(d) converting the isolated lead citrate to Pb and/or PbO; and
(e) incorporating the Pb and/or PbO into a battery plate.

In a preferred embodiment of the second aspect of the invention, the lead citrate is isolated with $PbSO_4$ as a component. It is further preferred that the Pb and/or PbO contains $PbSO_4$.

In a further aspect, the present invention provides a battery comprising plates recycled from lead waste as described in any of the previous aspects of the present invention.

In another aspect of the invention, there is provided a calcination product comprising Pb, PbO and $PbSO_4$ for use in the manufacture of battery plates.

BRIEF DESCRIPTION OF THE FIGURES

A detailed description of the invention is provided with reference to the drawings, in which:

FIG. 1 is the X-ray diffraction spectra of lead citrate (a) as generated from the data in Kourgiantakis et al *Inorganica Chimica Acta*, 2000, 297, 134; (b) produced from PbO; (c) produced from $PbO_2$; and (d) produced from $PbSO_4$, with a different lead citrate structure ($[3Pb.2(C_6H_5O_7)].3H_2O$).

DETAILED DESCRIPTION OF THE INVENTION

Figure 2A:
FIG. 2 is the SEM image of lead citrate monohydrate ($Pb(C_6H_6O_7).H_2O$) produced from (a) PbO (×4,000 magnification); (b) $PbO_2$ (×4,300 magnification); and $[3Pb.2(C_6H_5O_7)].3H_2O$ produced from (c) $PbSO_4$ (×4,500 magnification).

The term 'lead' is used herein to refer to elemental lead or a compound containing one or more lead atoms. Where reference in this application is made to elemental lead, the symbol Pb is used. Likewise, where reference to a particular compound containing lead is intended, the formula is recited, such as PbO and $PbO_2$ for lead monoxide and lead dioxide respectively. For convenience, the term 'lead citrate' is used to refer to $Pb(C_6H_6O_7)$ and hydrates thereof, as well as other stoichiometries, e.g. $3Pb.2(C_6H_5O_7)$, and their hydrates. In some aspects of the invention, the term 'lead citrate' is used to refer to $Pb(C_6H_6O_7)$ and hydrates thereof, as well as the product of $PbSO_4$ treated with aqueous citric acid solution and aqueous trisodium citrate. In further aspects of the invention, the term 'lead citrate' is used to refer to $Pb(C_6H_6O_7)$ and hydrates thereof.

Lead waste is lead containing waste obtainable from an industrial process where lead is a by-product of that process, or obtainable from a spent product containing lead. The majority of lead waste is available as lead battery paste from spent lead batteries. Lead waste is also available from cable sheaths, lead sheets from the construction industry, paints, nuclear storage articles, and electro-ceramic based PbO.

Lead waste in general refers to a product containing one or more of Pb (lead), PbO (lead monoxide), $PbO_2$ (lead dioxide) and $PbSO_4$ (lead sulfate). The lead waste may contain other matter depending on the source of the waste. The lead waste may include minor alloying metals such as Ca and Sb.

Lead in lead battery paste (also known as battery mud) is typically in the form of $PbSO_4$, $PbO_2$, PbO and Pb. Battery waste from a dry lead battery will have these components in the ranges 55-65 wt %, 15-40 wt %, 5-25 wt % and 1-5 wt % respectively. Other components in a battery paste may include, but are not limited to, carbon black, plastics, fibres and sulfate-containing compounds. The battery paste may include sulphuric acid. The exact composition of the battery paste will depend on the particular battery composition as well as the particular method used to obtain the battery paste. Methods of extracting battery paste from a battery are well-known to those of skill in the art of lead battery recycling. An example method is described in U.S. Pat. No. 4,118,219.

According to the method of the present invention, lead waste is treated with an aqueous citric acid solution. Citric acid is a relatively cheap, readily available organic acid. Citric acid is widely used in the food industry and is produced from bio-sources in amounts of 1.5 million tonnes per year worldwide. It is available commercially as citric acid monohydrate. Aqueous solutions of citric acid are made up according to standard techniques. In some alternative aspects of the present invention, other organic acids may be used instead of, or in combination with, citric acid. Preferred organic acids include organic carboxylic acids, preferably acetic acid and oxalic acid. In such alternative aspects, references to citric acid solution are references to organic acid solution, and references to lead citrate are references to the lead salt of the organic acid.

Preferably the concentration of citric acid in the aqueous solution is at most saturated, at most 2.5 mole/L, at most 2 mole/L or at most 1.5 mole/L. Preferably, the concentration of citric acid in the aqueous solution is at least 1 mole/L, at least 0.5 mole/L or at least 0.1 mole/L. Most preferably, the concentration of citric acid in the aqueous solution is 1.2 mole/L.

The lead waste may be treated with aqueous citric acid solution by mixing the waste and the solution together. Agitation of the mixture may be achieved by use of a stirrer bar controlled by a magnetic stirrer, or by an overhead stirrer with a paddle. On a larger scale, the mixture may be contained in a vessel equipped with a suitable mixing device. Other methods of agitating the mixture will be apparent to those skilled in the art.

Lead waste containing Pb and/or PbO is treated with aqueous citric acid solution so as to generate lead citrate from Pb and/or PbO.

In some preferred embodiments of the invention, lead waste is treated with aqueous citric acid solution additionally comprising a metal citrate so as to generate lead citrate from $PbSO_4$. Preferably the metal citrate is an alkali metal citrate, preferably sodium citrate. Sodium citrate is widely used in the food industry for controlling pH, as preservative and for enhancing flavour of food products. Sodium citrate is available commercially as a di-hydrate form ($Na_3(C_6H_5O_7).2H_2O$). Aqueous solutions of citric acid additionally comprising a metal citrate are made up according to standard techniques.

Treatment of lead waste with the aqueous citric acid solution additionally comprising sodium citrate generates sodium sulfate as a by-product. The sodium sulfate may be recovered from the treatment solution, either before or after the recovery of lead citrate. Sodium sulfate has many industrial uses, for example in the detergent industry, and the sodium sulfate recovered from the treatment solution may be supplied to these industries after appropriate purification, if necessary. The utilisation of by-products from the present process is advantageous as it reduces the overall cost of lead production.

Lead citrate may be prepared from $PbO_2$ using only aqueous citric acid solution, according to the method described in Ferracin et al *Hydrometallurgy* 2002, 65, 137. However, the rate of reaction is significantly improved by the addition of hydrogen peroxide to the aqueous solution.

In some preferred embodiments of the invention, lead waste is treated with the aqueous citric acid solution additionally comprising hydrogen peroxide so as to generate lead citrate from $PbO_2$. Aqueous solutions of citric acid additionally comprising hydrogen peroxide are made up according to standard techniques. Alternatively, $PbO_2$ can be reduced using known reducing agents. Metal hydrides or hydrogen gas may be used. The reduction step may be performed prior to the treatment of the waste with the aqueous solution.

The additional reagents described in the preferred embodiments may be added to the aqueous citric acid solution before treatment of the lead waste, or the reagent may be added during the treatment.

The lead waste may be treated first with an aqueous citric acid solution so as to generate lead citrate from Pb and/or PbO, and then subsequently an additional reagent, such as hydrogen peroxide or sodium citrate, may be added to the solution to generate lead citrate from another lead source, such as $PbO_2$ or $PbSO_4$. The sequential treatment of the lead waste in this manner allows the conditions for each treatment step to be optimised for a particular reaction thereby ensuring a high yield of lead citrate and therefore a high recovery rate of lead from the lead waste.

One or more additional components may be added to the aqueous citric acid solution. A co-solvent may be added to alter the solvent characteristics of the treatment solution. The component may aid dissolution of material from the lead waste, or aid dissolution of products formed from the reaction of the aqueous citric acid solution with the lead waste. An alcohol may be added to the solution, preferably an alkyl alcohol. Most preferably the alcohol is ethanol or methanol. Alternatively, the component may promote the precipitation of a particular product from the treatment solution. The component may be a metal hydroxide, preferably an alkali metal hydroxide, most preferably potassium hydroxide or sodium hydroxide.

The additional component may be an acid, for example a mineral or organic acid. Preferably, the component is acetic acid, hydrochloric acid or nitric acid. Strong acids increase the solubility of the lead citrate product in the aqueous solution. Another advantage of using a mineral acid, such as HCl, is that reactive impurities or alloying elements such as Ca are dissolved into the aqueous solution and thus removed from contaminating the lead citrate product. Less reactive impurity elements such as Sb, Cu, Bi and As can also be separated by reacting the soluble chlorides with lead powder to precipitate and recover the metallic elements for further use.

The additional component may be a quench agent, for example a neutralising agent, such as a base, or a saturated salt solution, such as brine. The quench agent reduces the reactivity of the aqueous citric acid solution, or reduces the reactivity of an additional reagent or another additional component in the aqueous citric acid solution.

The additional components may be added before, during or after treatment of the lead waste.

Lead waste recovered after treatment with aqueous citric acid solution may be processed to separate other battery constituents for recycling or appropriate disposal. Recovered lead waste may be re-used in methods of the present invention to ensure maximum lead recovery. The lead waste may first be treated with aqueous citric acid solution and then separated from the solution. The separated paste may then be retreated with aqueous citric acid solution or treated with a solution comprising an additional reagent as described herein. The separation of treatment steps allows each step to be performed under conditions optimal for the recovery of lead citrate from the lead waste starting material.

Preferably, the pH of the aqueous citric acid solution is at least pH 1.4, at least pH 2, or at least pH 3. Preferably, the pH of the aqueous citric acid solution is at most pH 6, or at most pH 5. The upper and lower limits are combinable in any combination. The pH of the solution may be set by the concentration of citric acid in the solution. Alternatively, additional acids may be included in the aqueous citric acid solution to provide an appropriate pH. The aqueous citric add solution may be buffered. The amount of lead recovered as lead citrate from the lead waste is increased at the preferred pH values.

The temperature of the aqueous citric acid solution may be controlled during the treatment step. Preferably, the temperature of the solution is maintained at least 0° C., at least 10° C., or at least 15° C. Preferably, the temperature of the solution is maintained at most 25° C., at most 35° C., or at most 45° C. The preferred upper and lower temperatures are combinable in any combination. The inventors have established that the amount of lead recovered as lead citrate from the lead waste is increased at the preferred temperatures.

The reaction time for treatment of the lead waste with the aqueous citric acid solution may be selected so as to affect the yield of lead citrate. Preferably, the reaction time is at least 1 minute, at least 5 minutes, or at least 10 minutes. Preferably the reaction time is at most 90 minutes, at most 60 minutes, or at most 20 minutes. The preferred upper and lower timings are combinable in any combination. The inventors have established that the yield of lead citrate is increased at the preferred reaction times. The reaction may be stopped by separating the treated lead waste from the aqueous solution, or by adding a quenching agent to the reaction mixture.

The solid to liquid ratio (the weight of lead starting material to weight of water in the aqueous treatment solution), the concentration of citric acid, the concentration of the optional additional reagents, the ratio of citric acid to lead, and the ratio of citric acid to optional additional reagents may be selected so as to affect the yield of lead citrate.

The inventors have established that the amount of lead compound remaining in solution after recovery of lead citrate may be minimised, and therefore recovery of lead in lead citrate maximised, at particular solid to liquid ratios. Preferably the solid to liquid ratio is 1:x, where x refers to the liquid and is at most 50, at most 25, or at most 10. Preferably x is at least 1 or at least 2. The preferred upper and lower values are combinable in any combination.

The conversion of $PbO_2$ to lead citrate can be maximised at particular reagent ratios. Preferably, the mole ratio of $PbO_2$ to alkali metal citrate, preferably sodium citrate, is 1:x, where x refers to alkali metal citrate. Preferably x is at least 1, 2 or 3 and at most 5, 6 or 7. Most preferably x is 4. The upper and lower limits of these ratios are combinable in any combination.

Preferably, the mole ratio of $PbO_2$ to $H_2O_2$ is 1:y where y refers to $H_2O_2$. Preferably y is at least 0.1, 0.5 or 1 and at most 3 or 4. Most preferably y is 2. The upper and lower limits of these ratios are combinable in any combination.

The inventors have found that the conditions for treatment of the lead waste can be selected so at to yield a lead citrate product containing $PbSO_4$.

The amount of $PbSO_4$ in the lead citrate product may be controlled by appropriate choice of lead waste treatment conditions. The amount of metal citrate used in the treatment solution may be selected so as to minimise or maximise the conversion of $PbSO_4$ to lead citrate. Other reaction conditions may be varied to alter the amount of $PbSO_4$ in the lead citrate product. The skilled person will appreciate that such variation will depend on the nature of the lead waste amongst others. Without limitation, the following may be altered: reaction temperature, reaction time, concentration of any reagent, ratio of any reagent, and solid to liquid ratio.

Lead citrate is sparingly soluble in aqueous citric acid solution. Once the treatment of the lead waste is deemed complete, the aqueous solution containing the lead citrate may be separated from the remaining insoluble lead waste. This may be achieved by decanting off the solution, by filtration or centrifugation. Lead citrate may then be recovered from the separated aqueous solution as described below.

Lead citrate may be recovered from solution by precipitation. The precipitation of lead citrate may be initiated or promoted by altering the temperature of the solution, altering the concentration of components in the solution, or by seeding. Additionally or alternatively, additional components may be added to the solution to initiate or promote precipitation. In a preferred embodiment, acetic acid is added to the lead citrate containing solution to initiate or promote precipitation. Such techniques are well known to those of skill in the art, and other techniques within the scope of the skilled person will also be apparent.

The precipitated lead citrate may be separated from the remaining solution by filtration, decanting or centrifugation. The separated solution may be recycled to ensure maximum recovery of lead citrate from the solution. The precipitated lead citrate is typically recovered as lead citrate monohydrate.

Alternatively, after treatment of the lead waste, lead citrate may be precipitated out of solution and separated with the insoluble lead waste components from the treatment solution. The lead citrate may then be redissolved and separated from the lead waste, and then precipitated and recovered as described above.

Recovered lead citrate may be purified in further steps. The lead citrate may be re-crystallised. Other techniques for the purification of lead citrate will be apparent to those of skill in the art.

Preferably, the recovered lead citrate is substantially pure. Preferably, the lead citrate is at least 80%, at least 90%, at least 95%, or at least 99% pure by weight.

Recovered lead citrate is converted to Pb and/or PbO, which may be used in the manufacture of lead batteries.

Lead citrate may be converted to Pb and/or PbO by calcination. Electrowinning techniques may also be used to generate Pb and/or PbO. Electrowinning of lead citrate from an aqueous solution is inefficient owing to the sparingly soluble nature of this lead compound. Co-solvents may be used to increase the solubility of lead citrate in the electrowinning process.

The calcination of lead citrate is particularly advantageous as the organic citrate acts as a fuel in the combustion process to increase the temperature of the calcination. This reduces the amount of energy that is required to be supplied to the calcination furnace, and consequently reduces the operating cost of the calcination step. Such a process is referred to as 'self-propagation synthesis'. The thermal energy embodied in the citrate arises from bio-sources, thus making the process carbon neutral. From FIG. 5, it can be seen that sufficient thermal energy is available for calcining the lead citrate.

Preferably, the calcination temperature is at least 250° C., at least 350° C. or at least 450° C. Preferably the calcination temperature is at most 1,100° C., at most 800° C. or at most 650° C. The preferred upper and lower temperatures are combinable in any combination.

Preferably, the Pb and/or PbO calcination product is substantially pure. Preferably, the purity of Pb and/or PbO is at least 80%, at least 90%, at least 95%, or at least 99% pure by weight.

The ratio of Pb to PbO in the calcination product is dependent on the calcination temperature. At high temperatures Pb is the predominant lead product, and at lower temperatures, PbO is the predominant product. Calcination of lead citrate in air at atmospheric pressure yields substantially pure Pb at selected temperatures. Preferably the calcination temperature is at least 800° C., at least 900° C. or at least 1,000° C. Calcination of lead citrate in air at atmospheric pressure yields substantially pure PbO at selected temperatures. Preferably the calcination temperature is at most 500° C. or at most 400° C.

The partial pressure of oxygen in the calcination combustion chamber has an influence on the composition of the combustion product. At low partial pressures of oxygen, Pb is the predominant lead product. At high partial pressures of oxygen, PbO is the predominant lead product.

A low partial pressure of oxygen allows the production of Pb substantially free of PbO. This procedure avoids the pyrolysis method that has been previously described for the production of Pb from lead citrate (see U.S. Pat. No. 3,297, 590). The literature method yields a highly pyrophoric product that is the result of very fine particles of carbon in the Pb particulate product. The present invention avoids the dangers of working with a pyrophoric Pb product.

Preferably the combustion atmosphere comprises oxygen. Preferably, the partial pressure of oxygen in the calcination combustion chamber is at least 0.01 atm, at least 0.05 atm or at least 0.1 atm. Preferably, the partial pressure of oxygen in the calcination combustion chamber is at most 0.5 atm, at most 1 atm or at most 5 atm. Preferably the partial pressure of oxygen is 0.21 atm (air pressure). Most preferably the calcination is performed in air at standard pressure.

The preferred upper and lower partial pressures are combinable in any combination.

The composition of the product of the calcination process can be controlled by appropriate selection of reaction conditions. The product can therefore be produced according to the specific industry in which it is to be used. Thus, the ratio of Pb to PbO in the product is independent of the amount of Pb, PbO, $PbO_2$ and $PbSO_4$ in the battery waste.

Changes in flow rate of oxygen, and the presence of other compounds in the recovered lead citrate, have an influence on the final composition and morphology of the calcination product. In preferred embodiments, the flow rate is controlled. In selected embodiments additives are added to the lead citrate prior to or during calcination.

The conditions for treatment of the lead waste can be selected so at to yield a lead citrate product containing $PbSO_4$.

The lead citrate product may contain at least 0.1 wt %, or at least 0.5 wt % or at least 1 wt % $PbSO_4$. The lead citrate product may contain at most 3 wt %, or at least 5 wt % or at least 10 wt % $PbSO_4$. The preferred upper and lower limits are combinable in any combination.

Preferably, when this lead citrate product is calcinated, it is done so under conditions at which $PbSO_4$ does not decompose. Preferably the lead citrate is heated at most at 1,100° C., above which temperature decomposition of $PbSO_4$ occurs.

Heating $PbSO_4$ at elevated temperatures generates $SO_2$, which must be dealt with according to local environmental regulations. The treatment of $SO_2$ is therefore operationally expensive. The inventors have established that lead citrate may be converted to Pb and/or PbO at the preferred calcination temperatures without decomposing $PbSO_4$ and without generating $SO_2$.

Pb and PbO prepared from lead citrate may be supplied for industrial use. Pb and PbO are commonly used in the manufacture of lead batteries. Typically, the positive and negative plates of a lead battery are produced from Pb-containing PbO granules. The product of the present calcination process may be used as the source for these lead-containing PbO granules. Alternatively, the conditions employed to generate Pb and/or PbO from lead citrate according to the present invention can allow the preparation of granules suitable for use directly in the manufacture of lead battery plates. Advantageously, a lead calcination product containing Pb and/or PbO along with small amounts of $PbSO_4$ prepared as described herein may be used in the production battery plates.

In the normal practice for making electrode plates, Pb-containing PbO granules are mixed with dilute acid, preferably dilute sulfuric acid, and the resulting-paste is applied to a Pb alloy grid structure which is then allowed to cure. During the curing process, a small amount of $PbSO_4$ is generated which serves a very useful function of binding the granules together to mechanically maintain the battery plates. The present invention provides a method for the production of a lead calcination product containing Pb and/or PbO along with small amounts of $PbSO_4$. The $PbSO_4$ can be used advantageously as a binder material in the fabrication of battery plates.

After the battery is assembled, PbO is converted to $PbO_2$ on the positive plate and to metallic Pb on the negative plate. The conversion is undertaken in an aqueous sulphuric acid electrolytic medium using electrochemical oxidation and reduction by application of a suitable current. $PbSO_4$ is unaffected by the electrochemical process and continues to act as a binding material for the battery plates. In current battery production methods, metallic lead is used as the precursor material for PbO. The present method is particularly advantageous because it provides the direct precursor needed for battery plate manufacture.

Preferred and/or optional features of any aspect of the invention may be applied to any other aspect in any combination or sub-combination, unless the context demands otherwise.

Various further aspects and embodiments of the present invention will be apparent to those skilled in the art in view of the present disclosure. All documents mentioned in this specification are incorporated herein by reference in their entirety.

Certain aspects and embodiments of the invention will now be illustrated by way of example and with reference to the figures.

EXAMPLES

Lead Citrate Synthesis

The reaction conditions suitable for the synthesis and recovery of lead citrate were investigated. Preliminary experiments were conducted using lead compounds available from commercial suppliers as a model for scrap battery paste.

Analytically pure commercially available lead oxide (PbO, Acros Organics), lead dioxide ($PbO_2$, Fisher Scientific), lead sulphate ($PbSO_4$, Fisher Scientific), citric acid monohydrate ($C_6H_8O_7.H_2O$, Acros Organics), and, where appropriate, 27.5% hydrogen peroxide ($H_2O_2$) solution in water (Aldrich) and tri-sodium citrate ($Na_3C_6H_5O_7.2H_2O$, Fisher Scientific), were used as starting materials.

The reactions were performed in a beaker equipped with a magnetic stirrer bar mounted on a magnetic stirrer hotplate. In each experiment the total volume of the aqueous citric acid solution was 30 mL. The reaction mixtures were stirred at a constant rate of 250 rpm, unless stated otherwise. The temperature of the reaction was monitored and controlled by contact thermometer. Reaction completion was gauged by colour change of the reaction mixture as well as reaction sampling and analysis.

At reaction completion, the reaction solution was filtered and the solids collected and analysed. The filtrate solutions were analysed for residual lead content by inductive coupled plasma atomic emission spectrophotometer (ICP-AES) (Varian Liberty AX Sequentional ICP-AES).

Each experiment was performed at least three times.

In the experiments below, the solid to liquid ratio is defined as the weight of lead starting material to weight of water in the reaction.

The lead in solution value gives the amount of lead, as lead ion, that remains dissolved in the treatment solution. The lead that is recovered from the solution includes precipitated lead citrate and undissolved and unreacted lead starting material. Lead in solution is expressed as weight of lead in solution as a percentage of weight of water. Thus, 0.5% lead in 30 mL of solution is equivalent to 0.15 g of lead.

A high percentage value indicates that recovery of lead from the reaction mixture is poor. A low value therefore indicates that the level of lead recovery is high.

It should be borne in mind that a high percentage value of lead in solution can represent a high rate of conversion of lead starting material to lead citrate. The high percentage value indicates that the recovery of the dissolved lead citrate from solution is poor for the particular conditions studied.

A low percentage value of lead in solution could represent high recovery of lead in the form of undissolved and unreacted starting material. In practice however, where there was sufficient reagent, it was observed that the majority of the starting material was consumed. For many of the reactions, the starting material was entirely consumed.

Preparation of Lead Citrate from Pbo

PbO was treated with aqueous citric acid solution at different temperatures, reagent ratios, solid and liquid ratios, and reaction times, as set out in Tables 1 and 2 below. After completion of the reaction, the resulting precipitate was allowed to settle for 15 minutes then filtered. The collected solids were washed with distilled water, filtered and dried at 80° C. overnight to give $Pb(C_6H_6O_7).H_2O$.

Preparation of Lead Citrate from Pb

The inventors have established that the behaviour of Pb is similar to that of PbO. The conditions and results described above for PbO are therefore generally applicable to Pb.

Preparation of Lead Citrate from $PbO_2$ $PbO_2$ was treated with aqueous citric acid solution and 27% hydrogen peroxide solution at different temperatures, reagent ratios, solid to liquid ratios, and reaction times, as set out in Tables 3, 4 and 5 below. After completion of the reaction, the resulting precipitate was allowed to settle for 15 minutes then filtered. The collected solids were washed with distilled water, filtered and dried at 80° C. to give $Pb(C_6H_6O_7).H_2O$.

A sample of $Pb(C_6H_6O_7).H_2O$ was also obtained according to the method of Ferracin et al, *Hydrometallurgy*, 2002, 65, 137. Accordingly, $PbO_2$ was treated with aqueous citric acid solution for 24 hours to give lead citrate product. Addition of hydrogen peroxide to the starting aqueous citric acid solution was resulted in complete conversion within 1 hour.

After further experimentation it was also found that treatment of 1 mole $PbO_2$ with 2 moles $H_2O_2$ and 4 moles $C_6H_8O_7.H_2O$ at 20° C. for 60 minutes gave a reproducibly high yield of lead citrate product.

Although $PbO_2$ was not reduced by hydrogen peroxide alone under mild conditions, in the presence of sodium citrate, $Pb^{4+}$ rapidly reduced to $Pb^{2+}$. With a complex dissolution mechanism, it is believed that hydrogen peroxide behaved as a reducing agent together with citric acid in the solution media.

Preparation of Lead Citrate from $PbSO_4$ $PbSO_4$ was treated with aqueous citric acid solution and aqueous trisodium citrate at different temperatures, reagent ratios, solid to liquid ratios, and reaction times, as set out in Tables 6, 7 and below. After completion of the reaction, the resulting precipitate was allowed to settle for 15 minutes then filtered. The collected solids were washed with distilled water, filtered and dried at room temperature to give $[3Pb.2(C_6H_5O_7)].3H_2O$.

Analysis

The starting materials and the end products were characterised by FT-IR (Tensor 27, Bruker Optics). Asymmetric stretching vibrations at 1599 cm$^{-1}$ and 1662 cm$^{-1}$, as well as symmetric vibrations at 1520 cm$^{-1}$ and 1327 cm$^{-1}$, indicated the presence of the carboxylate group in the analysed compounds, with strong absorptions of carboxylate structure. The spectral results corresponded to those previously described (Kourgiantakis et al *Inorganica Chimica Acta*, 2000, 297, 134; Bellamy, Advances in Infra-red Group Frequencies, The Infrared Spectra of Complex Molecules, Chapman and Hall, 1980; Lin-Vien et al *The Handbook of Infrared and Raman Characteristic Frequencies of Organic Molecules*, Academic Press, London, 1991).

X-ray diffraction (XRD) spectra for the dried end products were obtained using Philips X-ray diffractometer (Cu Kα, 40 kV, 25 mA, calibrated with Si-standard). X-ray diffraction patterns of $Pb(C_6H_6O_7).H_2O$ precipitated from both PbO and $PbO_2$ could not be identified using existing diffraction databases (International Crystallographic Diffraction Data).

CIF (Crystallographic Information File) data for $Pb(C_6H_6O_7).H_2O$ held on the CSD (Cambridge Structural Database) was collected from the Chemical Database Service, and an X-ray diffraction pattern created from the data. FIG. 1 shows the comparison of precipitated $Pb(C_6H_6O_7).H_2O$ from both PbO (b) and $PbO_2$ (c), with $Pb(C_6H_6O_7).H_2O$ synthesised according to the method associated with the deposited CIF data (a)(as described in Kourgiantakis ibid). Also, shown is the spectra of precipitated $[3Pb.2(C_6H_5O_7)].3H_2O$ produced from $PbSO_4$ (d).

The morphology of the material was examined by field emission scanning electron microscopy (FESEM-JEOL 6340F) and transmission electron microscopy (TEM-JEOL 200CX).

Figure 2B:
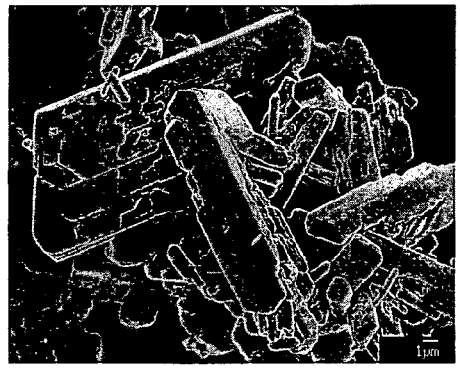
Figure 2C:
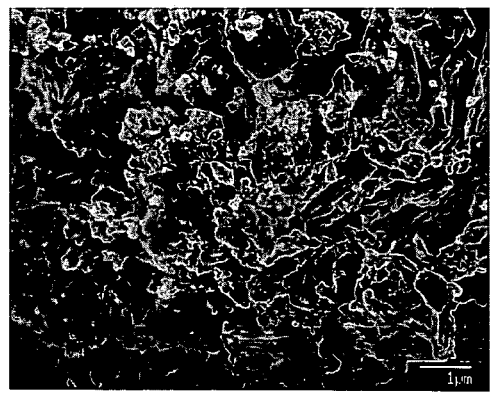

SEM images of Pd-coated $Pb(C_6H_6O_7).H_2O$, precipitated from both PbO and $PbO_2$ are shown in FIGS. 2(*a*) and (*b*), respectively. The SEM image of Pd-coated $[3Pb.2(C_6H_5O_7)].3H_2O$, precipitated from $PbSO_4$ is shown in FIG. 2(*c*).

The SEM images indicate the similarity of the precipitates produced from PbO and $PbO_2$. The SEM of $Pb(C_6H_6O_7).H_2O$ produced from $PbO_2$ shows particles smaller than those produced from PbO. Without wishing to be bound by theory, it is believed that the reaction of PbO is controlled by the rate of diffusion of citric acid solution through layers of $Pb(C_6H_6O_7).H_2O$ that precipitate during the reaction. This is thought to provide bigger particles of $Pb(C_6H_6O_7).H_2O$ within a shorter reaction time. In comparison, the morphology of the $Pb(C_6H_6O_7).H_2O$ particles derived from $PbO_2$ is believed to be dependent on the reaction rate, hence smaller sized particles were produced. The SEM of $[3Pb.2(C_6H_5O_7)].3H_2O$ produced from $PbSO_4$ shows crystals that are still plate like, but smaller and more broken up in comparison with those in FIGS. 2(*a*) and (*b*).

Figure 3:
FIG. 3 is a TEM image of $Pb(C_6H_6O_7).H_2O$ produced from PbO.

Samples for TEM were prepared by dispensing $Pb(C_6H_6O_7).H_2O$ in methanol in an ultrasonic bath, and then placed on a holey carbon film supported on a CU grid. The methanol was subsequently allowed to evaporate. During TEM analysis sudden melting/spoilage of the sample was observed. This was believed to be decomposition of $Pb(C_6H_6O_7).H_2O$ during the electron bombardment conditions of the TEM. FIG. 3 is a TEM image of $Pb(C_6H_6O_7).H_2O$ produced from PbO.

Calcination

Figure 4:
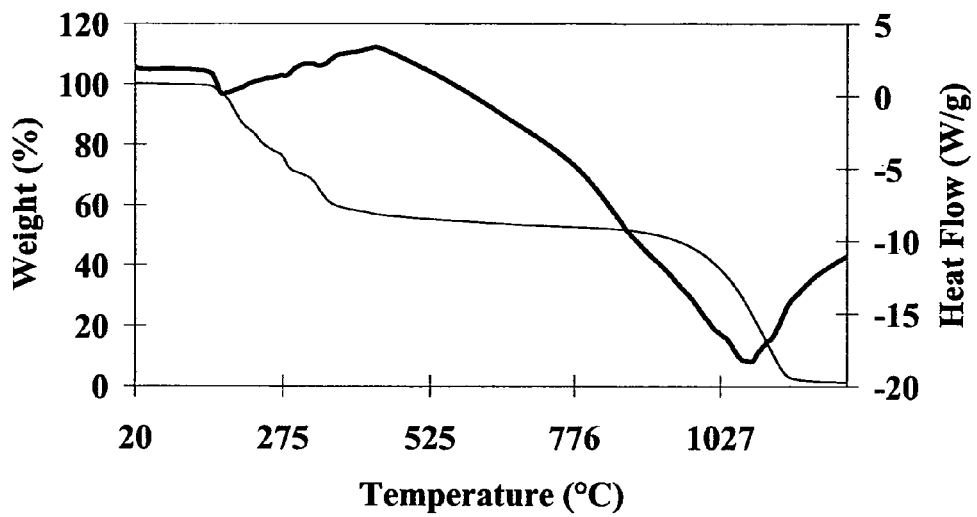
FIG. 4 is a DCS spectrum of $Pb(C_6H_6O_7).H_2O$ produced from PbO.
Figure 5:
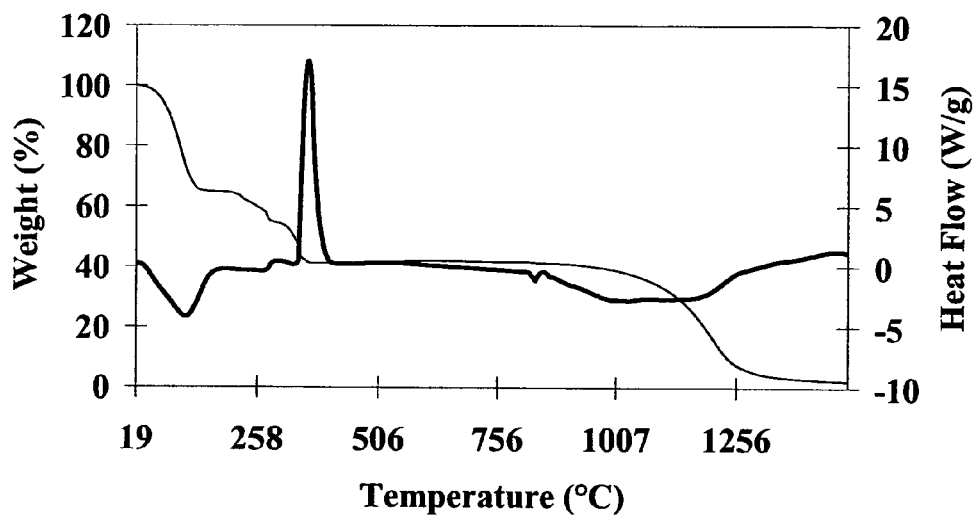
FIG. 5 a DCS spectrum of $[3Pb.2(C_6H_5O_7)].3H_2O$ produced from $PbSO_4$.

The thermal behaviour of $Pb(C_6H_6O_7).H_2O$ and $[3Pb.2(C_6H_5O_7)].3H_2O$ was analysed using differential scanning calorimetery (DSC) (Q600, SDT, TA Instruments). Samples were kept within an atmosphere of pure nitrogen at were heated at a rate of 20° C./min. FIG. 4 shows the DSC spectrum of a $Pb(C_6H_6O_7).H_2O$ sample produced from PbO. FIG. 5 shows the DSC spectrum of a $[3Pb.2(C_6H_5O_7)].3H_2O$ sample produced from $PbSO_4$.

Figure 6:
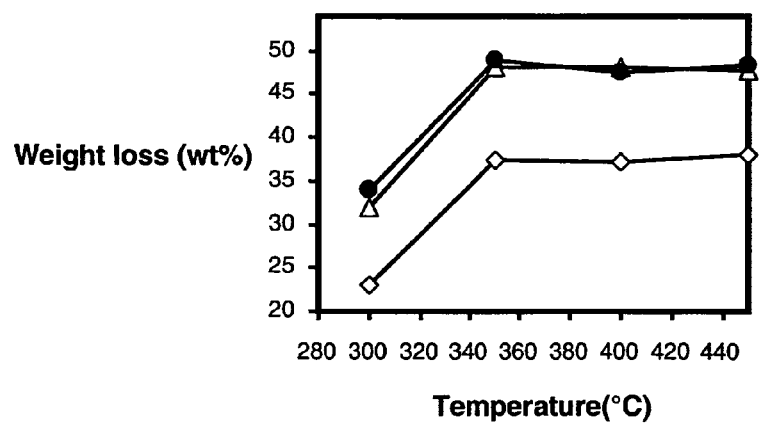
FIG. 6 shows weight loss as a function of calcinations temperature from combustion of lead citrate produced from pure PbO (triangles), $PbO_2$ (circles) and $PbSO_4$ (diamonds).

Effects of the calcination temperature on weight loss of the different precursors are shown in FIG. 6. The weight loss increased as the calcination temperature increased from 300° C. to 350° C. and then is relatively stable in the temperature range of 350° C.-400° C. This indicates that the citrate can decompose completely over 350° C. The weight loss at the temperature >350° C. of both precursor I and precursor II (from PbO and $PbO_2$) are 48%, significantly more than that for precursor III (from $PbSO_4$) at 38%.

Figure 7:
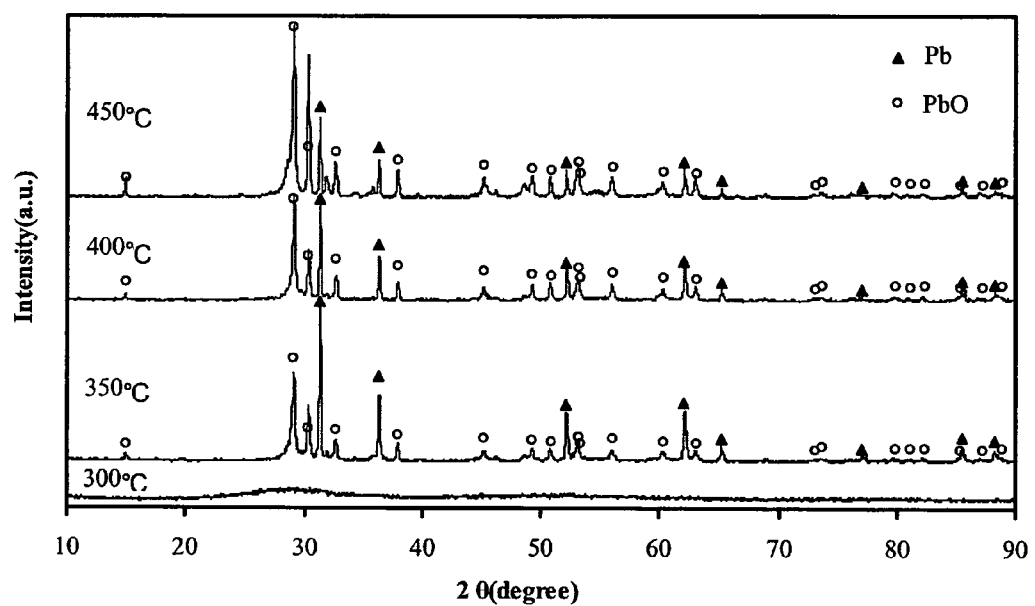
FIG. 7 is the X-ray diffraction spectra of the product of calcinations of lead citrate at different temperatures (Pb—triangles; PbO—circles).

The XRD patterns of the products of combustion synthesis from the precursor I, is shown in FIG. 7 (Pb—triangles; PbO—circles). The products of combustion are amorphous at 300° C., and transform into crystalline phases of both massicot (orthorhombic lead oxide) and lead metal at 350° C., 400° C., and 450° C. This also confirms that the citrates could be decomposed completely over 350° C., consistent with the results from thermal experiments (as shown in FIG. 6) on weight loss. The relative intensity of the peaks of the lead metal phase decreased, while the relative intensity of the peak of the massicot phase increased as the calcination temperature increased from 350° C. to 450° C. for precursor I and similar argument applies to precursors II and III. The relative proportions of PbO and Pb can be controlled by temperature and also by partial pressure of oxygen.

TABLE 1

| Experiment | nPbO/ nC$_6$H$_8$O$_7$·H$_2$O | Temp. (°C.) | Reaction time (min) | Lead in Sol. (%) |
|---|---|---|---|---|
| PbO-4 | 0.25 | 20 | 60 | 1.238 |
| PbO-3 | 0.5 | 20 | 60 | 0.821 |
| PbO-2 | 0.75 | 20 | 60 | 0.645 |
| PbO-1 | 1 | 20 | 60 | 0.490 |
| PbO-5 | 1.25 | 20 | 60 | 0.359 |
| PbO-6 | 2 | 20 | 60 | 0.0455 |
| PbO-7 | 2.5 | 20 | 60 | 0.057 |
| PbO-12 | 1 | 20 | 15 | 0.143 |
| PbO-11 | | 20 | 30 | 0.186 |
| PbO-1 | | 20 | 60 | 0.490 |
| PbO-12 | 1 | 20 | 15 | 0.144 |
| PbO-14 | | 30 | 15 | 0.160 |
| PbO-15 | | 40 | 15 | 0.182 |

The solid to liquid ratio in the experiments above was 1:5.

TABLE 2

| Experiment | Temp. (°C.) | Solid:Liquid ratio | Lead in Sol. (%) |
|---|---|---|---|
| PbO-12 | 20 | 1:5 | 0.144 |
| PbO-18 | 20 | 1:4 | 0.062 |
| PbO-17 | 20 | 1:3 | 0.017 |
| PbO-17 | 20 | 1:3 | 0.017 |
| PbO-23 | 30 | | 0.067 |
| PbO-20 | 40 | | 0.103 |
| PbO-18 | 20 | 1:4 | 0.062 |
| PbO-19 | 30 | | 0.097 |
| PbO-24 | 40 | | 0.111 |

The reaction time for the above experiments was 1.5 min and the ratio of nPbO:nC$_6$H$_8$O$_7$·H$_2$O was 1:1.

TABLE 3

| Experiment | H$_2$O$_2$ (mol) | C$_6$H$_8$O$_7$·H$_2$O (mol) | Temp. (°C.) | Lead in Sol. (%) |
|---|---|---|---|---|
| PbO$_2$-8 | 3 | 3 | 20 | 2.599 |
| PbO$_2$-10 | | 4 | 20 | 2.955 |
| PbO$_2$-11 | | 6 | 20 | 3.520 |
| PbO$_2$-9 | 4 | 3 | 20 | 2.623 |
| PbO$_2$-2 | | 4 | 20 | 3.049 |
| PbO$_2$-4 | | 6 | 20 | 3.613 |
| PbO$_2$-12 | 6 | 3 | 20 | 2.664 |
| PbO$_2$-5 | | 4 | 20 | 3.202 |
| PbO$_2$-6 | | 6 | 20 | 3.707 |
| PbO$_2$-8 | 3 | 3 | 20 | 2.599 |
| PbO$_2$-9 | 4 | | 20 | 2.624 |
| PbO$_2$-12 | 6 | | 20 | 2.664 |
| PbO$_2$-10 | 3 | 4 | 20 | 2.955 |
| PbO$_2$-2 | 4 | | 20 | 3.049 |
| PbO$_2$-5 | 6 | | 20 | 3.202 |
| PbO$_2$-11 | 3 | 6 | 20 | 3.520 |
| PbO$_2$-4 | 4 | | 20 | 3.613 |
| PbO$_2$-6 | 6 | | 20 | 3.707 |
| PbO$_2$-2 | 4 | 4 | 20 | 3.049 |
| PbO$_2$-3 | | | 30 | 3.861 |
| PbO$_2$-13 | | | 40 | 4.801 |

The solid to liquid ratio in the experiments above was 1:50. The experiments were carried out over 15 min.

TABLE 4

| Experiment | Solid:Liquid Ratio | Lead in Sol. (%) |
|---|---|---|
| PbO$_2$-2 | 1:50 | 3.049 |
| PbO$_2$-14 | 1:10 | 1.749 |
| PbO$_2$-19 | 1:5 | 1.476 |

The experiments were carried out over 15 min at 20° C. with H$_2$O$_2$ (4 mol) and C$_6$H$_8$O$_7$·H$_2$O (4 mol).

TABLE 5

| Experiment | H$_2$O$_2$ (mol) | C$_6$H$_8$O$_7$·H$_2$O (mol) | Temp. (°C.) | Stir rate (rpm) | Time (min) | Lead in Sol. (%) |
|---|---|---|---|---|---|---|
| PbO$_2$-20 | 4 | 4 | 20 | 250 | 20 | 2.809 |
| PbO$_2$-21 | | | | | 40 | 2.943 |
| PbO$_2$-2 | | | | | 60 | 3.049 |

The solid to liquid ratio in the experiments above was 1:50.

TABLE 6

| Experiment | nPbSO$_4$/ nNa$_3$C$_6$H$_5$O$_7$·2H$_2$O | Reaction time (min) | Temperature (°C.) | Lead in Sol. (%) |
|---|---|---|---|---|
| PbSO$_4$-1 | 1.000 | 60 | 20 | 19.792 |
| PbSO$_4$-2 | 0.500 | | | 22.156 |
| PbSO$_4$-3 | 0.333 | | | 28.580 |
| PbSO$_4$-4 | 0.25 | | | 56.083 |
| PbSO$_4$-2 | 0.5 | 60 | 20 | 22.156 |
| PbSO$_4$-5 | | | 30 | 23.954 |
| PbSO$_4$-6 | | | 40 | 33.309 |
| PbSO$_4$-7 | 0.5 | 120 | 20 | 16.286 |
| PbSO$_4$-9 | | | 30 | 18.246 |
| PbSO$_4$-10 | | | 40 | 21.010 |
| PbSO$_4$-16 | 0.5 | 15 | 20 | 43.619 |
| PbSO$_4$-17 | | 30 | | 33.347 |
| PbSO$_4$-2 | | 60 | | 22.156 |
| PbSO$_4$-7 | | 120 | | 16.286 |
| PbSO$_4$-15 | | 300 | | 15.200 |

TABLE 7

| Experiment | Temp (°C.) | Citric Acid (mol) | Lead in Sol. (%) |
|---|---|---|---|
| PbSO$_4$-22 | 20 | 0.1 | 7.341 |
| PbSO$_4$-21 | | 0.25 | 5.367 |
| PbSO$_4$-20 | | 0.5 | 3.647 |
| PbSO$_4$-13 | | 1.0 | 2.277 |
| PbSO$_4$-18 | | 1.5 | 2.220 |
| PbSO$_4$-19 | | 2.0 | 2.204 |
| PbSO$_4$-20 | 20 | 0.5 | 3.647 |
| PbSO$_4$-25 | 30 | | 4.150 |
| PbSO$_4$-28 | 40 | | 4.802 |

All reactions in Tables 6 and 7 were conducted over 60 min and the ratio of nPbSO$_4$:nNa$_3$C$_6$H$_5$O$_7$·2H$_2$O was 1:2. The solid to liquid ratio was 1:3.

TABLE 8

| Experiment | Solid:Liquid ratio | Lead in Sol. (%) |
|---|---|---|
| PbSO$_4$-13 | 1:20 | 2.277 |
| PbSO$_4$-29 | 1:10 | 1.078 |
| PbSO$_4$-26 | 1:5 | 1.048 |

All reactions were conducted over 60 min at 20° C. with citric acid (1 mol) and the ratio of $nPbSO_4$:$nNa_3C_6H_5O_7.2H_2O$ was 1:1.

The invention claimed is:

1. A method for the recovery of lead from lead waste comprising one or more of Pb, PbO, $PbO_2$, and $PbSO_4$, the method comprising the steps of:
   (a) treating the lead waste with aqueous citric acid solution so as to generate lead citrate;
   (b) isolating lead citrate from the aqueous solution; and
   (c) converting the isolated lead citrate to Pb and/or PbO.

2. The method according to claim 1, wherein the lead citrate is $Pb(C_6H_6O_7)$ and hydrates thereof, as well as the product of $PbSO_4$ treated with aqueous citric acid solution and aqueous trisodium citrate.

3. The method according to claim 1 wherein the lead waste is lead battery paste.

4. The method according to claim 1 wherein the pH of the aqueous citric acid solution is in the range pH 1.4 to 6.

5. The method according to claim 1 wherein the aqueous citric acid solution additionally comprises a metal citrate.

6. The method according to claim 5 wherein the metal citrate is sodium citrate.

7. The method according to claim 1 wherein the aqueous citric acid solution additionally comprises hydrogen peroxide.

8. The method according to claim 7 wherein the lead waste comprises PbO and the mole ratio of PbO to hydrogen peroxide is in the range 1:0.1 to 1:4 and/or the mole ratio of PbO to citric acid is in the range 1:1 to 1:7.

9. The method according to claim 1 wherein the temperature of the aqueous citric acid solution is maintained in the range 0 to 45° C.

10. The method according to claim 1 wherein the solid to liquid ratio of the lead waste to aqueous solution is in the range 1:1 to 1:50 w/w.

11. The method according to claim 1 wherein the isolated lead citrate is converted to Pb and/or PbO by calcination.

12. The method according to claim 11 wherein the calcination temperature is in the range 250 to 1,100° C.

13. The method according to claim 11 wherein the partial pressure of oxygen in the calcination is in the range to 0.01 to 5 atm.

14. A method of recycling a lead battery, the method comprising the steps of:
   (a) obtaining lead battery paste from a lead battery;
   (b) treating the lead battery paste with aqueous citric acid solution so as to generate lead citrate;
   (c) isolating lead citrate from the aqueous solution;
   (d) converting the isolated lead citrate to Pb and/or PbO; and
   (e) incorporating the Pb and/or PbO into a battery plate.

15. The method according to claim 14, wherein the lead citrate is $Pb(C_6H_6O_7)$ and hydrates thereof, as well as the product of $PbSO_4$ treated with aqueous citric acid solution and aqueous trisodium citrate.

16. The method according to claim 14 wherein the lead citrate is isolated together with $PbSO_4$.

17. The method according to claim 16 wherein the Pb and/or PbO includes $PbSO_4$.

* * * * *